(12) United States Patent
Ganev et al.

(10) Patent No.: US 7,595,612 B2
(45) Date of Patent: Sep. 29, 2009

(54) WIDE SPEED RANGE ELECTRIC POWER GENERATION SYSTEM USING HIGH REACTANCE PERMANENT MAGNET MACHINE

(75) Inventors: Evgeni Ganev, Torrance, CA (US); Andrew R. Druzsba, Redondo Beach, CA (US); Addy Fouad Alkhatib, Northridge, CA (US)

(73) Assignee: Honeywell International Inc., Morristown, NJ (US)

( * ) Notice: Subject to any disclaimer, the term of this patent is extended or adjusted under 35 U.S.C. 154(b) by 309 days.

(21) Appl. No.: 11/751,492

(22) Filed: May 21, 2007

(65) Prior Publication Data

US 2008/0290843 A1 Nov. 27, 2008

(51) Int. Cl.
*H02P 9/14* (2006.01)
(52) U.S. Cl. .............................. 322/46; 322/47; 322/44; 322/54
(58) Field of Classification Search .................. 322/46, 322/47, 44.54
See application file for complete search history.

(56) References Cited

U.S. PATENT DOCUMENTS

| | | | |
|---|---|---|---|
| 3,671,788 A | 6/1972 | Knudson et al. | |
| 3,848,177 A | 11/1974 | Gynn | |
| 4,825,139 A | 4/1989 | Hamelin et al. | |
| 5,714,823 A | 2/1998 | Shervington et al. | |
| 5,793,178 A | 8/1998 | Biais | |
| 5,793,625 A | 8/1998 | Balogh | |
| 5,798,596 A | 8/1998 | Lordo | |
| 5,942,818 A | 8/1999 | Satoh et al. | |
| 6,583,995 B2 | 6/2003 | Kalman et al. | |
| 6,920,023 B2 | 7/2005 | Dooley | |
| 6,924,629 B1 | 8/2005 | Mueller et al. | |
| 6,956,301 B2 | 10/2005 | Gupta et al. | |
| 7,002,317 B2 | 2/2006 | Ganev | |
| 7,116,083 B2 | 10/2006 | Kalman et al. | |
| 7,119,467 B2 | 10/2006 | Dooley | |
| 7,453,241 B2 * | 11/2008 | Keiter et al. | 322/28 |
| 7,518,344 B2 * | 4/2009 | Sihler | 322/58 |

* cited by examiner

*Primary Examiner*—Nicholas Ponomarenko
*Assistant Examiner*—Iraj A Mohandesi
(74) *Attorney, Agent, or Firm*—Oral Caglar, Esq.

(57) ABSTRACT

A device and method for controlling the output of a wide speed range high reactance permanent magnet machine based PGS is provided. The windings of a permanent magnet machine are coupled to a three-phase diode bridge. A transistor is used for temporarily short-circuiting said diode bridge. A capacitor smoothes the voltage at a voltage detection point. A control unit generates a signal that switches the transistor in response to a voltage detected at the voltage detection point. The control unit signal modifies the duty cycle of the switching of the transistor in response to variations in the speed of the power generator to maintain a desired voltage at the voltage detection point.

17 Claims, 4 Drawing Sheets

WIDE SPEED RANGE ELECTRIC POWER GENERATION SYSTEM USING HIGH REACTANCE PERMANENT MAGNET MACHINE

BACKGROUND OF THE INVENTION

The present invention generally relates to high speed generators and, more specifically, to apparatus and methods for regulating voltage to a DC power distribution bus over a wide speed range in a high reactance permanent magnet machine based electrical power generation system.

Electrical power generation systems (PGS) play a significant role in the modern aerospace/military industry. Recently, this is particularly true in the area of more electric architecture (MEA) for aircraft and spacecraft. The commercial aircraft business is moving toward no-bleed air environmental control systems (ECS), variable-frequency (VF) power distribution systems, and electrical actuation.

Military ground vehicles have migrated toward hybrid electric technology, where the main propulsion is performed by electric drives. Therefore, substantial demand for increased power generation has emerged. Future space vehicles will require electric power generation systems for thrust vector and flight control actuation. These systems must be more robust and offer greatly reduced operating costs and safety compared to the existing Space Shuttle power systems.

These new aerospace trends have significantly increased power generation needs. This has led to increased operating voltages to reduce system losses, weight, and volume. New power, quality and electromagnetic interference (EMI) requirements have been created to satisfy both quality and performance needs. The overall result has been a significant increase in the installed electric power, creating challenges in accommodating this equipment in the new platforms. Therefore, overall system performance improvement and power density increases are necessary for the new-generation hardware to satisfy MEA. Decreasing the cost of power generation systems will make the new platforms more affordable.

Wide Speed Range (WSR) PGS applicable to MEA must satisfy a complex set of requirements. The main function of such a system is electrical power generation; hence the system must provide conversion of the mechanical power supplied by the prime mover to conditioned electrical power supplied to the distribution bus. Generation is typically defined as continuous power at 100 percent load. Increasing the load to 150 percent for a limited time may be required. The percentage of increase and time required for overloading varies from application to application.

Another requirement for WSR PGS applicable to MEA is steady-state regulation, which requires that the system maintain the output voltage constant within certain limits when the loads and other conditions are changed gradually. Transient regulation is a requirement that the system maintains the output voltage constant within certain limits when the loads and other conditions are changed rapidly. Transient limits are typically wider than steady-state limits. Typical regulation requirements can be found in MIL-STD-704E. Electromagnetic interference (EMI), both conducted and radiated emissions, are important requirements for an EPGS to provide proper operation of the installed electronics. At the same time, the electronic equipment including PGS should not be susceptible to the specified radiated emissions.

DC bus short-circuit protection is another requirement which must provide adequate protection when an external short-circuit fault occurs at the DC distribution bus. Feeder short-circuit protection function is also required to prevent excessive current flow in the electric machine and the interface electric machine power electronics to reduce damages that may lead to a hazardous condition. Power electronics short-circuit protection is required to prevent excessive current flow in the power electronics unit. Overvoltage protection is required to prevent excessive voltage across a power distribution bus. Overvoltage protection prevents damage of the electronics connected to the distribution bus.

Electric machines used in auxiliary power unit (APU) applications typically operate at constant speed or with small variation. The main engines of an airplane normally operate with a speed range where the ratio of maximum to minimum operating speed is about 2 to 1. This speed variation creates additional difficulties for a power generation system in providing regulated power within the entire speed range. There are some applications where the speed of the prime mover, for instance a helicopter engine, changes by a factor of up to 20. This wide speed range creates even more challenges due to variation of the electromotive force (emf) voltage of the machine with the speed.

The synchronous permanent magnet machine (PMM) presents a very competitive design that outperforms other electric machines in most applications when weight and size are critical. However, the rotor flux in a typical PMM is fixed and cannot be controlled or disengaged when a short-circuit is initiated. Unlike other machines where the excitation of the rotor flux can be controlled and even disabled quickly, a PMM continues to generate emf until the rotor stops rotating. Therefore, the PMM presents a hazard in some applications, leading to its limited use, particularly in the aerospace industry.

The High Reactance Permanent Magnet Machine (HRPMM) is one type of PMM in which, should it become shorted, the phase current magnitude can be internally limited to levels capable of being sustained either indefinitely, within the thermal limits of the system, or until the rotor speed can be reduced to zero. In some prior HRPMM power topologies the functional and protection requirements may be resolved. However, the operating speed range may still be quite narrow.

As can be seen, there is a need for a PMM-based power generation systems that can supply power to a DC bus within a wide speed variation while satisfying the functional and safety requirements discussed above.

SUMMARY OF THE INVENTION

In one aspect of the invention, a device for controlling a variable speed electrical power generator comprises: a permanent magnet machine generating an output voltage across output terminals, the permanent magnet machine having a plurality of stator windings; a diode bridge connected across the plurality of stator windings; a transistor for at least temporarily short-circuiting the diode bridge; a capacitor for smoothing the output voltage detected across the pair of output terminals; and a control unit for generating a signal that switches the transistor in response to a voltage detected across the pair of output terminals, the control unit signal modifying the duty cycle of the switching of the transistor in response to variations in the speed of the power generator to maintain a desired voltage across the pair of output terminals.

In another aspect of the invention a variable speed permanent magnet machine connected to a load comprises: a permanent magnet rotor; a stator assembly mounted adjacent the rotor and including a plurality of electrical windings disposed in a plurality of slots between a plurality of stator teeth and having a stator winding resistance $R_S$, the electrical windings being electrically connected to a permanent magnet machine output adapted to deliver generated output voltage from the permanent magnet machine; a voltage control circuit providing for a boost in the output voltage in a first rotational speed range, the voltage control circuit also providing limiting of output current to a pre-selected value in a second rotational speed range; wherein, in use, the movement of the rotor induces an alternating voltage and current in the electrical windings of a first polarity and the first alternating voltage and current induces a second alternating voltage and current of a second polarity in the electrical windings, and the voltage control circuit limiting of output current being provided by the second alternating voltage and current of a second polarity.

In a further aspect of the present invention, a method for controlling a wide speed range high reactance permanent magnet machine in a plurality of speed ranges comprises: determining an output voltage across output terminals of a circuit including a wide speed range high reactance permanent magnet machine having stator windings, a diode bridge connected across the stator windings, a solid state switch connected across the diode bridge and a PWM controller circuit connected to the solid state switch; if the wide speed range high reactance permanent magnet machine is in a low speed range, and if the detected output voltage is lower than a desired output voltage, increasing the duty cycle of the PWM controller to increase the detected output voltage; and if the detected output voltage is higher than the desired voltage, decreasing the duty cycle of said PWM controller to decrease the detected output voltage.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a wide speed range, high reactance permanent magnet machine (HRPMM) that may provide regulated voltage over wide variations in the rotational speed of the prime mover, and hence the HRPMM rotor. For example, the ratio of the maximum to minimum rotor speed may be as high as 20 to 1. At low machine rotational speeds, in a boost mode, the output voltage may be increased by using a pulse width modulated switch across a diode bridge to store energy in the electric machine and transfer this energy to the electric machine output. As the machine speed increases, the duty cycle of the switch may be increased to increase the output voltage. At high machine speeds, in a current limiting mode, the synchronous reactance of the HRPMM may be used to limit the current to the desired level, while the pulse width modulated switch may maintain a relatively constant duty cycle. This may be done by designing the machine parameters such that the short-circuit current is close to the operating current.

The present invention may be applicable to high speed generators where the voltage to a DC power distribution bus must be regulated over a wide speed range. One example is in helicopters where the speed of the prime mover of the generator may vary by a factor of 20 to 1. The present invention also provides an optimized solution for power generation in various applications such as MEA systems in aircraft and spacecraft, hybrid electric ground vehicles and other applications where weight and size are critical, including auxiliary power units.

Prior art based PGSs have not generally been able to provide a regulated voltage over wide rotor speed ranges. In contrast, the present invention can provide regulated voltage over rotor speed ranges as wide as 20 to 1. Further, unlike the prior art, the present invention employs a varying duty cycle of a pulse width modulated switch at slow machine speeds and close to constant duty cycle at high machine speeds. Prior art permanent magnet machines also have generally used separate inductors to provide voltage boost. In contrast, the present invention may use the inductance of the PMM to provide a voltage boost instead of using a separate inductor for this purpose.

Figure 1:
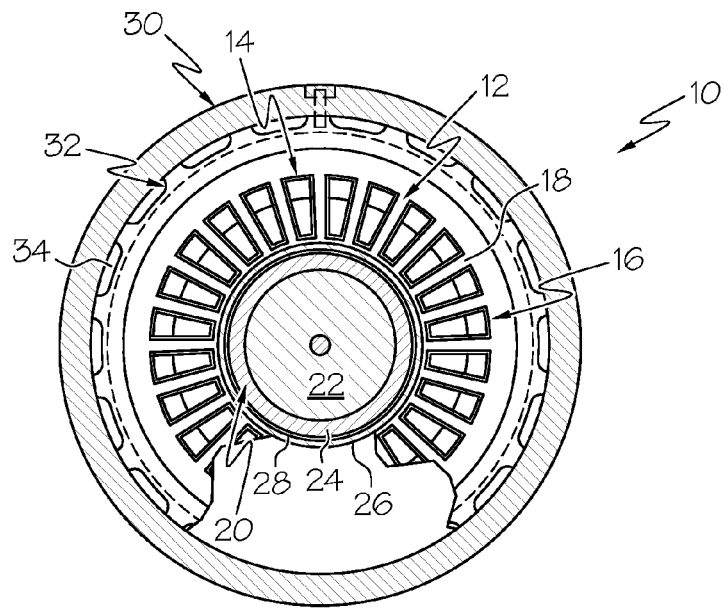
FIG. 1 is a radial cross-sectional view of a high reactance permanent magnet machine in accordance with one embodiment of the invention.

FIG. 1 shows a radial cross-section of a synchronous high reactance PMM 10 having a laminated tooth stator in accordance with one embodiment of the present invention. It will be appreciated by those skilled in the art that a HRPMM may be similar in construction to a conventional reactance PMM, with the basic difference being in the machine synchronous-reactance value, as determined by various design parameters described in more detail below. The HRPMM 10 may include a stator 12 having a plurality of stator windings 14 disposed in slots 16 between a plurality of stator teeth 18. It may be noted that the present invention could also be practiced using a stator ring toothless design. The stator 12 may be liquid or gas cooled in a conventional manner by placing a housing and cooling passages around the back iron. A number of alternative cooling and housing approaches could be implemented.

Also shown in FIG. 1 is a rotor 20 which may be a permanent magnet two-pole rotor suitable for high-speed implementations. In lower speed applications the present invention could also be implemented with a rotor having more than two poles. The rotor 20 may include a magnet 22 enclosed in an inconel sleeve 24 for structural integrity. An air-gap 28 may exist between the stator 12 and the rotor 20, which may provide a cooling air passage. A bore seal 26 may be placed in the air-gap to create a separation between stator 12 and rotor 20, if required. Additional cooling flow, typically air, can be provided in the air-gap 28 for a better thermal result if required. The losses of this machine may be primarily concentrated in the stator. The losses in the rotor may be negligible.

A conventional aluminum housing 30 may surround the stator 12. An aluminum spacer 32 with air cooling slots 34 may be provided between the housing 30 and the spacer 32 to provide additional means for cooling the HRPMM 10.

Figure 2:
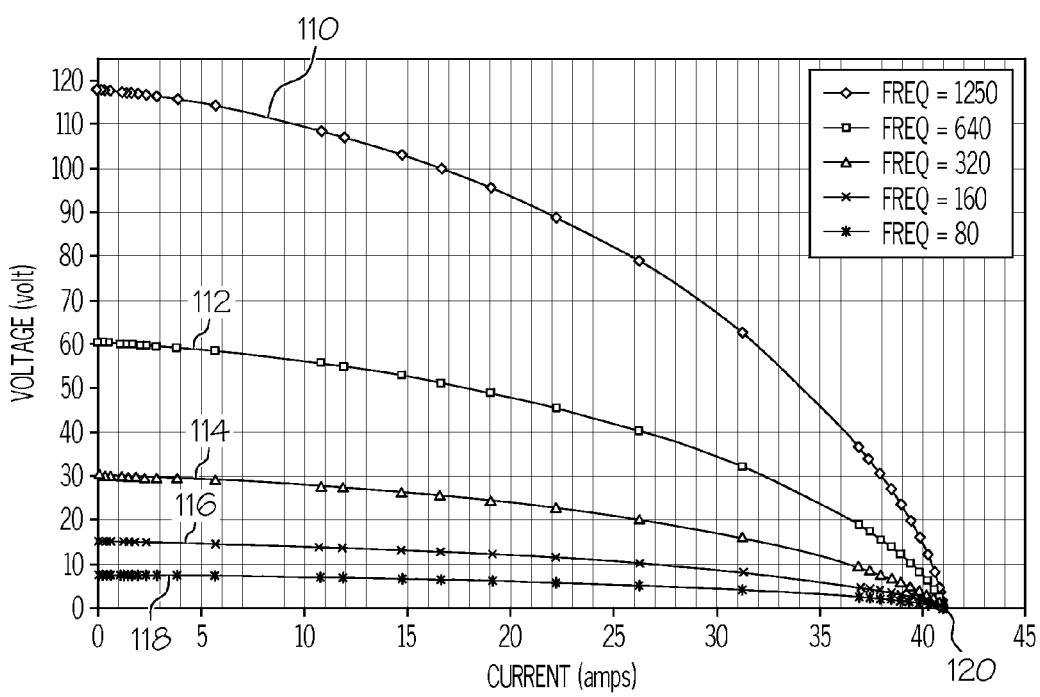
FIG. 2 is a graph of the voltage versus current characteristics of a high reactance permanent magnet machine at various speeds in accordance with one embodiment of the invention.

FIG. 2 shows the V-I characteristics of the HRPMM 10 of the present invention for a specific application at different speeds. In particular, FIG. 2 shows the amplitude of the machine terminal voltage at 38, 40 and 42 as a function of the current through the load. Curves 110, 112, 114, 116 and 118 show the V-I characteristics of the HRPMM 10 at 1,250 Hz, 640 Hz, 320 Hz, 160 Hz and 80 Hz respectively. Curve 110 represents the V-I curve at the highest operating speed, where the frequency is 1250 Hz. The back emf voltage on curve 110 is 118 $V_{rms}$ L-N (line-to-neutral). For each of the curves 110, 112, 114, 116 and 118, as the current through the load 64 (shown on the horizontal axis) increases, the machine terminal voltage at terminals 38, 40, and 42 decreases. The emf voltage across terminals 38, 40, and 42 may reduce linearly with the speed reduction. The curve 118 at the lowest speed of 80 Hz appears below all the other curves. At that speed of 80 Hz shown in curve 118, the frequency is 80 Hz and the back emf voltage is 7.55 Vrms.

The short-circuit current point 120 may be approximately the same for all V-I curves. This phenomenon may be due to the relation expressed in equation 2, as shown below, where $R_S$ can be ignored with a good approximation for practical purposes. While not explicitly shown in FIG. 2, it can be appreciated that for different speeds, $E_{EMF}$ and $X_S$ may be changing linearly. Therefore, the ratio $E_{EMF}$ over $X_S$ may be constant for different speeds, which represents the short-circuit value.

Figure 3:
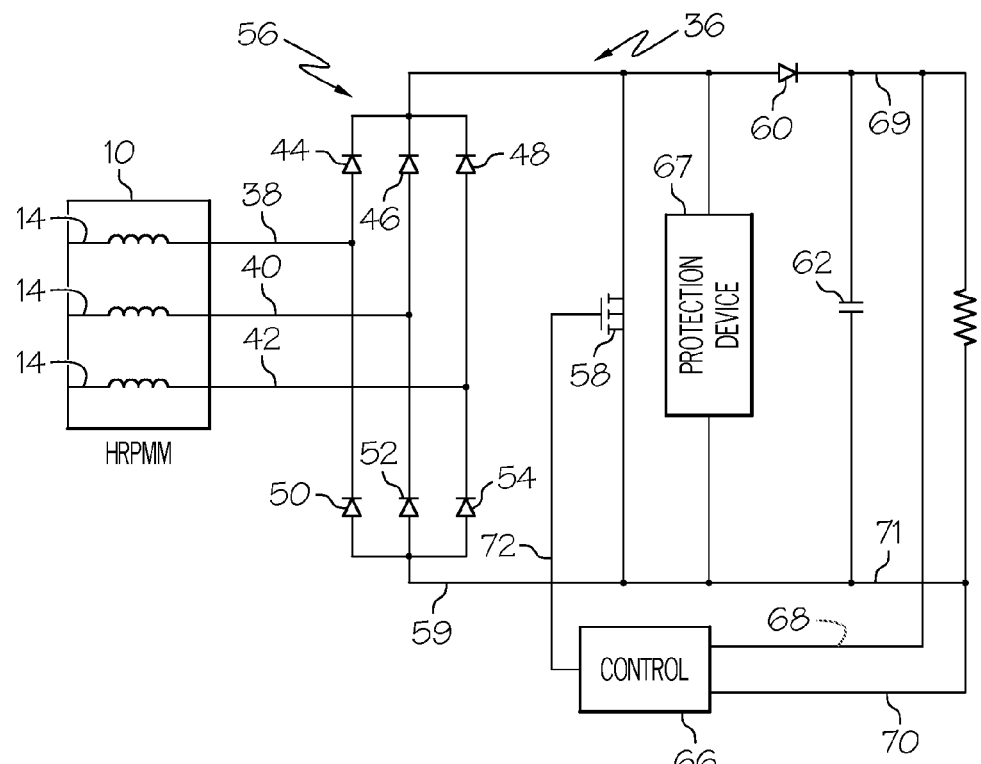
FIG. 3 is a block diagram of the wide speed range electric power generation system using a high reactance permanent machine in accordance with one embodiment of the invention.

FIG. 3 is a block diagram showing additional details of the HRPMM based PGS 20 in accordance with one embodiment of the invention. In particular, FIG. 3 shows a voltage control circuit 36. Three machine terminals 38, 40 and 42 attached to the HPRMM may supply a three phase AC voltage to the voltage control circuit 36. Six diodes 44, 46, 48, 50, 52 and 54 may be arranged to form a three phase bridge rectifier circuit 56 connected to input terminals 57, 59. A solid-state switch 58 may be connected in parallel with the rectifier diodes 44-54 to short the input terminals 57, 59 through the rectifier. Solid state switch 58 may be a conventional MOSFET or IGBT transistor. A diode 60 may be connected between the solid state switch 58 and a capacitor 62 to prevent reverse discharge of the capacitor 62 during the shorting period. Capacitor 62 and load 64 may both be connected across output terminals 69, 71. The capacitor 62 may be connected in series with the diode 60 such that it may be charged and supply load 64 with 34 Vdc. Capacitor 62 also may filter out voltage ripple due to the rectification and switching. Pulse width modulation (PWM) control circuit 66 may use PWM to drive the solid state switch 58 to maintain the desired 34 Vdc at the capacitor 62 terminals. The PWM frequency may be selected constant at 20 KHz. A protection device 67 may comprise a variety of devices such as resistors, capacitors and thyristors, and is provided to protect the HRPMM 10 in various failure modes, such as the failure of solid state switch 58 in an open state.

In accordance with one embodiment of the invention, the HRPMM 10 may be designed with particular dimensions and materials to meet certain requirements. As a high reactance PMM it should have a synchronous reactance in the range of 1 m to 10 m. Also, as described below, the HRPMM may be configured such that the operating current across terminals 69, 71 is equal to the short-circuit current, that is, the current across terminals 69, 71 when load 64 is shorted, as described below.

In accordance with the invention, an HRPMM 10 that meets the above-discussed objectives is configured with various PMM parameters determined as described below. Key parameters of a HRPMM may be the phase-generated voltage $E_{EMF}$, and the synchronous impedance of the machine $Z_S$. If these two values are known explicitly, the mathematical analysis of the HRPMM may be relatively straightforward. The generated current, $I_M$, can be calculated, utilizing circuit analysis theory, as follows:

$$I_M = \frac{E_{EMF}}{Z_S + Z_L} = \frac{E_{EM}}{(R_S + jX_S) + [R_L + j(X_L - X_C)]} \quad (1)$$

In Equation (1), $R_S$ is the stator winding resistance and $X_S$ is the synchronous reactance. The load 64 is represented by $R_L$ (load resistance), $X_L$ (reactance) and $X_C$ (load admittance). The load resistance absorbs the real power delivered by the generator. The reactance represents the reactive load with inductive nature and the admittance represents the reactive load with capacitive behavior.

The short-circuit current of the HRPMM 10, for example the current at terminals 38, 40, and 42 when the load 64 is shorted, can be obtained from Equation (1) by postulating the load parameters to equal zero. The result is Equation (2).

$$I_{SC} = \frac{E_{EMF}}{Z_S} = \frac{E_{EM}}{(R_S + jX_S)} \quad (2)$$

The short-circuit current depends primarily on two basic machine parameters, $E_{EMF}$ and $Z_S$. For a conventional PMM, $E_{EMF}$ and $Z_S$ may be selected such that the short-circuit current is several times larger than the operating or nominal current. A reactance-per-unit quantity can be introduced to define the relative reactance (reactance per unit) $X_{PU} = I_{RATED}/I_{SC}$. For a conventional reactance machine, $X_{PU}$ may be from 0.2 to 0.3. In contrast, for the HRPMM 10 in accordance with one embodiment of the invention, $E_{EMF}$ and $Z_S$ are selected in such a way that the short-circuit current between terminals 69, 71 is similar to the operating current and $X_{PU}$ is from 0.8 to 1.0. One skilled in the art will appreciate the particular physical and electrical features of the HRPMM 10 that may be configured using known design techniques to achieve this $X_{PU}$.

Figure 4:
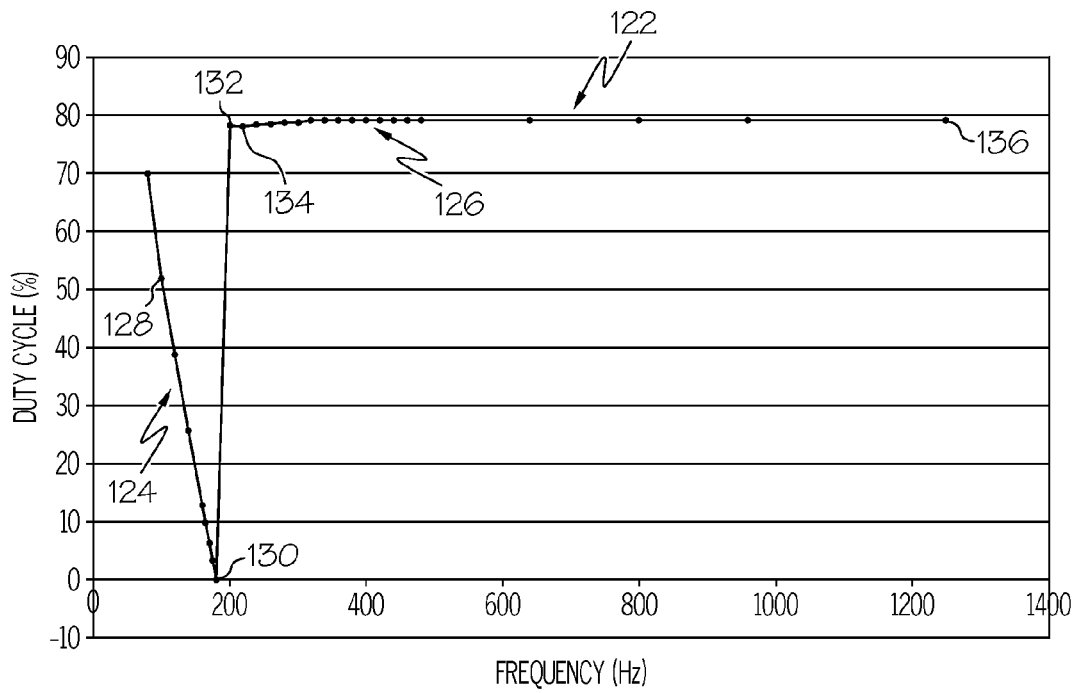
FIG. 4 is a graph of a regulation curve showing the duty cycle a pulse modulated switch shown in FIG. 3 over a range of speeds.

FIG. 4 shows a curve 122 of the duty cycle of the solid state switch 58 as a function of the machine frequency, which is linearly proportional to the speed. The curve 122 representing this relationship is called a regulation curve. The PWM control circuit 66 may use a closed loop control system to measure the output voltage across terminals 69, 71 and across the load 64. Connections 68 and 70 are connected to output terminals 69 and 71 respectively. PWM control circuit 66 generates a PWM signal in connection 72 based on the measured output voltage across terminals 69, 71 such that it may maintain the voltage of the load at 34 Vdc.

There are two distinct regions in the regulation curve 122: a boost region 124 and a current limiting region 126. The boost region 124 occurs when the rectified machine voltage across input terminals 57 and 59 is below the output regulated voltage across terminals 69, 71. In the boost region 124, approximately in the range of 80 Hz to 180 Hz, the solid state switch 58 may short the machine terminals 57, 59 in order to increase the current across terminals 57 and 59 and store more energy in the machine winding 14. Upon the opening of solid state switch 58, the energy may be released from the winding 14 to the capacitor 62. In this way, a voltage boosting operation, which increases the output voltage across terminals 69, 71, may be achieved. Boosting operation is described in equation 3 where $V_{out}$ is the output regulated voltage across terminals 69, 71, $V_{L\text{-}L\ P}$ is the input boosted voltage across terminals 57, 59, which is in fact the machine line-to-line peak voltage, and D is the duty cycle. The duty cycle is defined as $D=t_{on}/T$ where T is the period of the PWM signal on line 72 for solid state switch 58 and $t_{on}$ is the on-time of the PWM signal. Equation 3 does not account for the non-ideal characteristics of the diodes, switches and electric machine.

$$V_{out} = \frac{V_{L-LP}}{1-D} \qquad (3)$$

When the HRPMM 10 operates at the lowest speed, the frequency may be 80 Hz and the back emf voltage may be 7.55 Vrms L-N, as shown in curve 118 in FIG. 2. At this point the solid state switch 58 may operate at 70 percent duty cycle, as seen in the boost region 124 of curve 122 in FIG. 4, to keep the voltage across the load 64 at 34 Vdc.

As the speed of the HRPMM 10 is increased in the boost region 124, the frequency and back emf voltage increase and lower duty cycle may be required. Another data point 128 shown in FIG. 4 is at 100 Hz and 9.44 $V_{rms}$ respectively, where the duty cycle may be reduced to 51.8 percent. The PWM duty cycle may continue to drop gradually until it is almost equal to zero at frequency=180 Hz and the back emf voltage is 16.99 $V_{rms}$ L-N, which is shown at data point 130. When the frequency increases slightly above 180 Hz, the PWM duty cycle may increase again rapidly from zero to close to 80 percent at data point 132.

Above about 210 Hz, for example, at data point 134, the voltage control circuit 36 may transition from the boosting mode 124 to the current limiting mode 126. The duty cycle of the regulation curve may remain relatively constant for the high frequencies of the current limiting region 126. Thus, in the lower speed region 124, a higher duty cycle may boost the output voltage, but in the high speed region, from about 180 Hz to about 210 Hz, increases in the duty cycle will lower the output voltage. Above 210 Hz the duty cycle has a small effect on output voltage, because of current limiting as discussed below. A characteristic point 136 may be at the highest speed of operation where the frequency may be 1,250 Hz, the back emf voltage may be 118 $V_{rms}$ L-N, and the PWM may operate at 79.38 percent duty cycle. Different duty cycles values can be expected at different load values and during transients. These transients can be expected when fast speed or load changes occur.

In the current limiting mode of operation, the voltage control circuit 36 may use the synchronous reactance of the HRPMM to limit the output current. In particular, the elements of the WSR HRPMM 10 shown in FIG. 1 may be selected to increase the total impedance of the machine so as to create a desired synchronous inductance and thus, a leakage impedance. The synchronous inductance can be accurately defined and controlled by defining an appropriate shape or configuration for the stator 12, and by selecting appropriate materials for construction of the stator 12.

Figure 5:
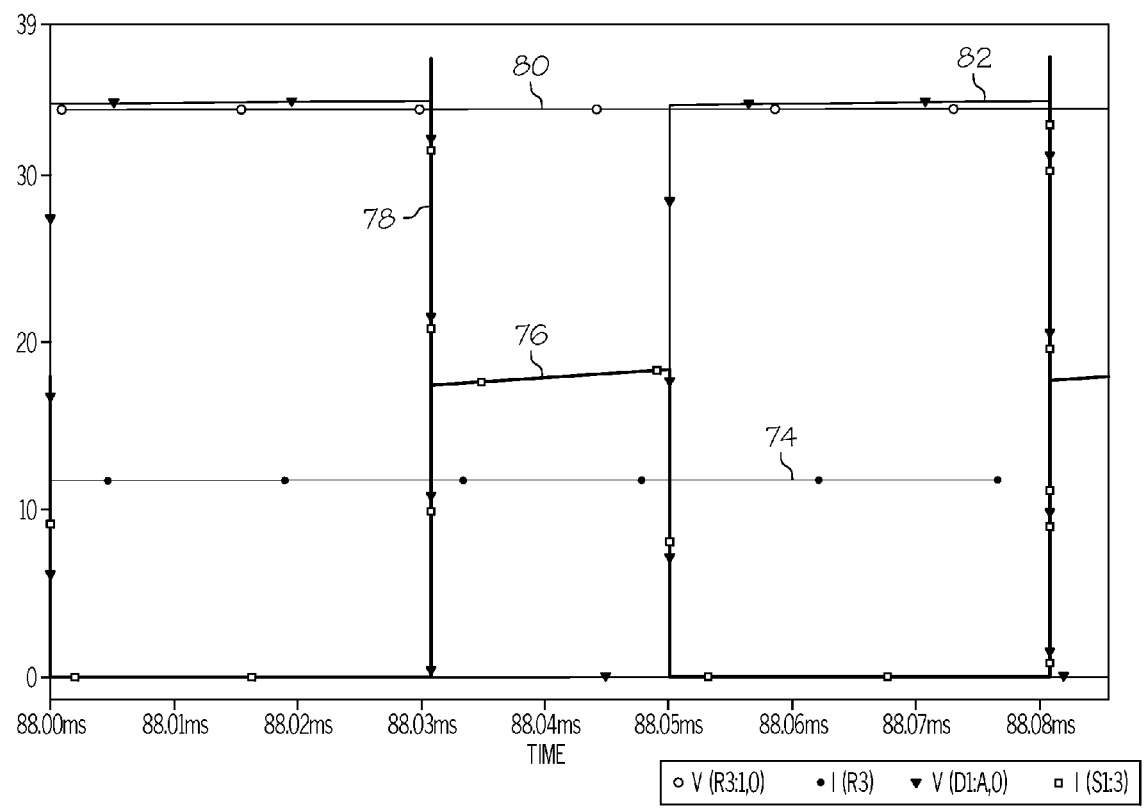
FIG. 5 is a timing diagram of selected output voltages and currents for the wide speed range electric power generation system shown in FIG. 3.

A simulation of the WSR HRPMM based EPGS shown in FIG. 3 may be used to confirm the expected results. In one simulation at frequency=120 Hz with input voltage 11.325 $V_{rms}$, the duty cycle of the PWM was 38.7 percent. Also, in the simulation the output voltage at the load was very close to 34 Vdc with current value very close to 11.76 Amps. Therefore, the delivered power to the load is close to 400 W, which is the desired power at the load. FIG. 5 shows the curves of the output voltages and currents at the solid state switch 58 and at the load 64 for one such simulation. In particular, the current at the load 64 is shown at line 74 is constant at 11.76 A. The current at switch 58 is shown at line 76 is 18.27 A. The current out of the rectifier circuit 56 is shown at line 78 and the voltage output at the load 64 is constant at 34V as shown at line 80. Line 82 shows the voltage at solid state switch 58 with is 34.32V.

Figure 6:
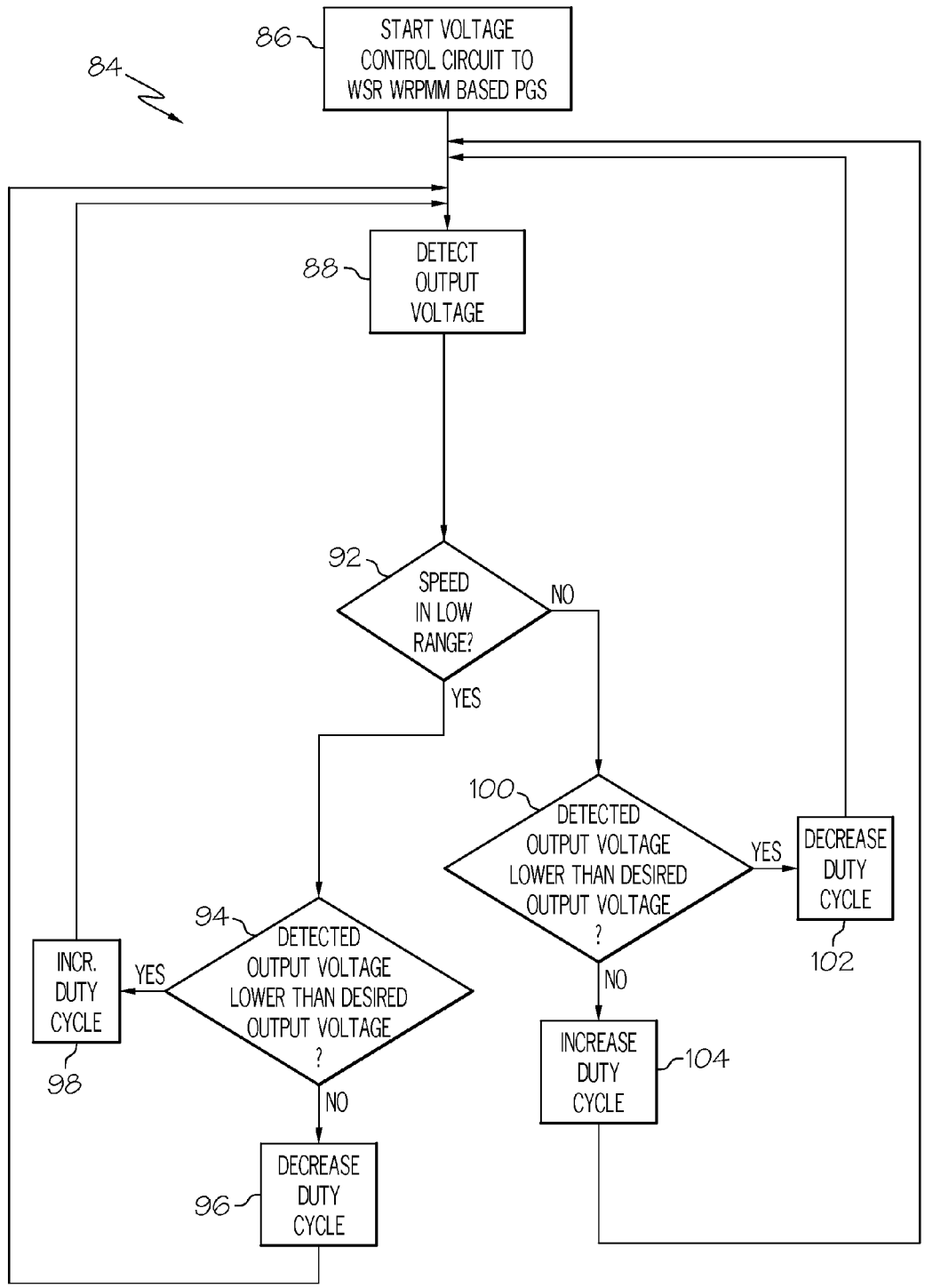
FIG. 6 is a flow chart of a process for regulating output voltage in a wide speed range high reactance permanent magnet machine in accordance with one embodiment of the invention.

FIG. 6 shows a flowchart of a process 84 of regulating voltage in a WSR HRPMM based PGS in accordance with one embodiment of the invention. Step 86 may comprise starting voltage control circuit to WSR HRPMM based PGS. The voltage control circuit 36 may comprise the diode bridge 56, the solid state switch 58 and the PWM control circuit 66 shown in FIG. 3. In step 88 the output voltage across terminals 69 and 71 may be detected.

Step 92 may determine if the speed of the WSR HRPMM is in the low range. This low range may correspond to the frequency range in FIG. 4 of about 80 Hz to about 180 Hz. If step 92 determined that the speed was in the low range, then the process 84 may move to step 94 to determine if the detected output voltage is lower than the desired output voltage. If so, the duty cycle of the PWM controller circuit 66 may be increased in step 98, which may have the effect of boosting the voltage. The process 84 may next return to step 88.

If step 94 determines that the detected output voltage is higher than the desired output voltage, step 96 will decrease the PWM duty cycle to lower output voltage. The process 84 may next return to step 88.

Returning now to step 92, if is determined that the WSR HRPMM is not in the low speed range, then the process may move from step 92 to step 100 which may determine if the detected output voltage is lower than the desired output voltage. If it is, the process moves to step 102 where the duty cycle is decreased to increase the output voltage. If step 100 determined that the measured output voltage was not lower than the desired output voltage, then step 104 will increase the duty cycle to decrease the output voltage, after which the process 84 may return to step 88.

As can be appreciated by those skilled in the art, the present invention provides an WSR HRPMM 10 that can deliver regulated voltage to a DC power distribution bus with a number of advantages. It can operate over an extended speed range of up to a factor of 20. It provides a simple power topology, using only one switch and seven diodes. In boost operation at low speed no dedicated inductance is required because the inductance of the electric machine is used as an energy storage element. In current limiting operation at high speed the synchronous reactance of the HRPMM is used for current limiting.

It should be understood, of course, that the foregoing relates to exemplary embodiments of the invention and that modifications may be made without departing from the spirit and scope of the invention as set forth in the following claims.

We claim:

1. A device for controlling a variable speed electrical power generation system comprising:
   a permanent magnet machine generating an output voltage across a pair of output terminals, said permanent magnet machine having a plurality of stator windings;
   a diode bridge connected across said plurality of stator windings;
   a transistor for at least temporarily short-circuiting said diode bridge;
   a capacitor smoothing said output voltage detected across said pair of output terminals; and
   a control unit for generating a signal that switches said transistor in response to a voltage detected across said output terminals, said control unit signal modifying the duty cycle of said switching of said transistor in response to variations in the speed of said power generator to maintain a desired voltage across said output terminals.

2. The device of claim 1 wherein during the time said transistor short-circuits said diode bridge, electrical energy is stored in said stator windings and after said transistor is switched from a short-circuiting mode to a non-short-circuiting mode, said energy is released to said capacitor, thereby boosting the voltage across said output terminals.

3. The device of claim 2 wherein said variable speed electrical power generator includes a rotor that rotates within a first rotational speed range and said boosting of said voltage occurs when said rotational speed is within said first range.

4. The device of claim 3 wherein, within said first rotational speed range said duty cycle decreases as said speed increases to maintain said desired voltage.

5. The device of claim 4 wherein said rotor also rotates within a second rotational speed range, which is higher than said first speed range and wherein said duty cycle is relatively constant throughout most of said second speed range to maintain said desired voltage.

6. The device of claim 1 wherein said electrical power generator is a high reactance permanent magnet machine.

7. The device of claim 6 wherein said permanent magnet machine is constructed such that the short-circuit current of said permanent magnet machine is approximately equal to the operating current of said permanent magnet machine.

8. The device of claim 7 wherein said permanent magnet machine is constructed such that the operating current $I_{RATED}$, the phase generated voltage $E_{EMF}$ and the machine impedance $Z_S$ result in a short-circuit current $I_{SC}=E_{EMF}/Z_S$, and a relative reactance $X_{PU}=I_{RATED}/I_{SC}$ that is in the range of 0.8 to 1.0.

9. The device of claim 6 wherein said stator is a tooth stator.

10. The device of claim 6 wherein said stator is a toothless stator.

11. The device of claim 6 wherein said permanent magnet machine includes a two-pole rotor.

12. A variable speed permanent magnet machine connected to a load comprising:
a permanent magnet rotor;
a stator assembly mounted adjacent said rotor and including a plurality of electrical windings disposed in a plurality of slots between a plurality of stator teeth and having a stator winding resistance $R_S$, said electrical windings being electrically connected to a permanent magnet machine output adapted to deliver generated output voltage from said permanent magnet machine;
a voltage control circuit providing a boost in said output voltage in a first rotational speed range, said voltage control circuit also providing limiting of output current to a pre-selected value in a second rotational speed range;
wherein, in use, movement of said rotor induces a first alternating voltage and current in said electrical windings of a first polarity, said first alternating voltage and current inducing a second alternating voltage and current of a second polarity in said electrical windings; and
said voltage control circuit limiting of output current being provided by said second alternating voltage and current of a second polarity.

13. The variable speed permanent magnet machine of claim 12 wherein:
each of said plurality of slots has a shape and construction and an associated windings with inductance which is sufficiently high relative to said induced alternating current such that, in use, a magnetic flux flows through said slot and around said electrical windings in response to said first alternating voltage and current of a first polarity in said electrical windings, thereby inducing said second alternating voltage and current in said electrical windings of a second polarity, which is opposite to said first polarity.

14. The variable speed permanent magnet machine of claim 12, said load having a load resistance $R_L$, a load reactance $X_C$, and a load admittance $X_C$, said permanent magnet machine having a phase-generated voltage $E_{EMF}$, an operating current $I_{RATED}$ and a synchronous impedance $Z_S$, wherein:
said permanent magnet machine is configured such that a short-circuit current $I_{SC}=E_{EMF}/Z_S$ of said permanent magnet machine is approximately equal to said operating current $I_{RATED}$ of said permanent magnet machine.

15. The variable speed permanent magnet machine of claim 1 wherein said variable speed permanent magnet machine is constructed such that said operating current $I_{RATED}$, said phase generated voltage $E_{EMF}$ and said machine impedance $Z_S$ result in a short-circuit current $I_{SC}=E_{EMF}/Z_S$, and a relative reactance $X_{PU}=I_{RATED}/I_{SC}$ that is in a range of 0.8 to 1.0.

16. The variable speed permanent magnet machine of claim 15 wherein said voltage control circuit further comprises:
a diode bridge connected to said electrical windings;
a transistor for at least temporarily short-circuiting said diode bridge; and
a pulse width modulation control unit for generating a pulse width modulated signal that switches said transistor in response to variations in a voltage detected at said voltage detection point resulting from variations in the speed of said variable speed permanent magnet machine to maintain a desired voltage at said voltage detection point.

17. The variable speed permanent magnet machine of claim 16 further comprising a diode element coupled between said diode bridge and said voltage detection point.

* * * * *